United States Patent

Abrams et al.

[11] Patent Number: 5,829,246
[45] Date of Patent: Nov. 3, 1998

[54] SELF-CLEANING AUGMENTOR FUEL DRAIN METERING DEVICE

[75] Inventors: Stuart Abrams, North Palm Beach; Kenneth J. Lampe, Palm Beach Gardens; George R. Celi, Royal Palm Beach, all of Fla.

[73] Assignee: United Technologies Corporation, Hartford, Conn.

[21] Appl. No.: 688,895

[22] Filed: Jul. 31, 1996

[51] Int. Cl.$^6$ .................................. F02K 3/10; F15D 1/02
[52] U.S. Cl. .................... 60/261; 60/39.094; 251/127; 138/43
[58] Field of Search .................. 60/261, 39.094, 60/39.81; 138/42, 43; 251/127

[56] References Cited

U.S. PATENT DOCUMENTS

| 1,144,306 | 6/1915 | Mock ....................................... 251/127 |
| 1,262,317 | 4/1918 | Finney et al. ............................. 138/42 |
| 1,697,481 | 1/1929 | Sloan ....................................... 251/127 |
| 1,915,867 | 6/1933 | Penick ...................................... 138/42 |
| 2,125,245 | 7/1938 | McCray .................................... 138/42 |
| 3,045,984 | 6/1962 | Cochran ................................... 138/42 |
| 3,987,809 | 10/1976 | Baumann ................................. 138/42 |
| 4,146,594 | 3/1979 | Raud . | |
| 4,209,038 | 6/1980 | Wiggans . | |
| 4,229,939 | 10/1980 | Smith ........................................ 60/261 |
| 4,715,395 | 12/1987 | Mainelli et al. ........................... 138/42 |
| 4,825,649 | 5/1989 | Donnelly et al. ......................... 60/261 |
| 4,870,763 | 10/1989 | Campbell . | |
| 5,357,995 | 10/1994 | King et al. . | |
| 5,505,229 | 4/1996 | Lee, II . | |
| 5,511,585 | 4/1996 | Lee, II . | |
| 5,544,480 | 8/1996 | Edwards ................................... 60/261 |

FOREIGN PATENT DOCUMENTS

| 1088797 | 3/1955 | France ..................................... 251/127 |
| 2184169 | 6/1987 | United Kingdom ...................... 60/261 |

OTHER PUBLICATIONS

Lee Company Product Catalog, pp. 4, 5, 48, and 49.

*Primary Examiner*—Timothy Thorpe
*Assistant Examiner*—Ted Kim
*Attorney, Agent, or Firm*—Richard D. Getz

[57] ABSTRACT

A fluid flow metering device is provided which includes a body and a plurality of flow restriction plates. The body has a duct, within which the flow restriction plates are disposed in a spaced apart manner. Each flow restriction plate includes an orifice disposed adjacent the interior wall surface of the duct and misaligned with orifices in adjacent plates. A side-to-side flow pattern is created by the position of orifices relative to the interior wall surface and the misalignment between orifices in adjacent plates which inhibits the accumulation of foreign debris within the duct.

12 Claims, 2 Drawing Sheets

SELF-CLEANING AUGMENTOR FUEL DRAIN METERING DEVICE

BACKGROUND OF THE INVENTION

1. Technical Field

This invention relates to gas turbine augmentor fuel controls in general, and to fuel drain metering devices in particular.

2. Background Information

In augmented gas turbine engines, fuel is introduced into the core gas flow and combusted aft of the turbine section to produce additional thrust. An augmentor fuel pump supplies pressurized fuel to an augmentor fuel controller which, in turn, distributes the fuel to a plurality of spray rings, bars, nozzles, or the like, positioned within the core gas flow path aft of the turbine. The position of the spray rings within the core gas flow path promotes uniformity in the distribution of fuel.

The spray rings positioned within the core gas flow path must tolerate the thermal environment created by the core gas flow exiting the turbine. Fuel left in the spray rings too long after augmentor demand is canceled will boil and leave an undesirable "coke" deposit. The coke deposits can foul valves within the spray rings and/or clog the plumbing connecting spray rings to the fuel controller. To avoid coke deposits, spray rings are provided with drains for dumping fuel. Typically the drains extend between the fuel controller and the interior of the augmentor, where the fuel is carried away with the core gas flow exiting the engine. The pressure difference between the fuel within the spray rings pressurized by the fuel pump and the static pressure within the augmentor adjacent the dump point forces the remaining fuel from the spray rings.

To avoid the undesirable coking, it is desirable to dump the fuel as quickly as possible. Unfortunately, dumping the fuel at a high flow rate causes the fuel to leave a visible signature (black smoke) exiting the nozzle of the engine which is not acceptable for most applications. A fluid flow metering device, disposed within the fuel drain, meters the flow rate of the draining fuel and avoids the signature trail.

Prior art flow metering devices have included a plug with an orifice sized to produce the maximum allowable flow rate which avoids the undesirable signature trail. A problem with this approach is that coke particles dislodged from the spray rings are often as large or larger than the diameter of the plug orifice. Particles drawn to the orifice by the flow of fluid can impede or stop the flow of fluid through the plug, thereby slowing or preventing the drain of fuel from the spray rings, which in turn causes the fuel to dwell longer in the spray rings. The longer dwell time leads to the aforementioned undesirable coking.

What is needed is a flow metering device that meters volumetric fluid flow accurately, one that can accommodate foreign debris without clogging, and one that is self-cleaning in the event foreign debris is ingested.

DISCLOSURE OF THE INVENTION

It is, therefore, an object of the present invention to provide a flow metering device that meters volumetric fluid flow accurately.

It is a further object of the present invention to provide a flow metering device that can accommodate foreign particles without clogging.

It is a still further object of the present invention to provide a flow metering device that is self-cleaning in the event a particle is ingested.

According to the present invention, a fluid flow metering device is provided which includes a body and a plurality of flow restriction plates. A duct extends through the body and the flow restriction plates are disposed, spaced apart within the duct. The spaces between flow restriction plates are referred to as chambers. Each flow restriction plate includes an orifice positioned adjacent the interior wall surface of the duct and misaligned with orifices in adjacent plates. A side-to-side flow pattern is created by the position of the orifices relative to the interior wall surface of the duct and the misalignment between orifices in adjacent plates. The side-to-side flow pattern "scrubs" the chambers and thereby inhibits the accumulation of foreign debris within the flow metering device.

One of the distinct advantages of the present invention is that larger pieces of foreign debris can be ingested without clogging the flow metering device, than is possible using prior art devices. Prior art flow metering devices which rely on a single orifice to meter fluid flow can not tolerate pieces of debris larger than the diameter of the orifice. The present invention, on the other hand, can provide the same flow metering as the aforementioned fixed orifice device, while using orifices substantially larger. The substantially larger orifices of the present invention accommodate much larger pieces of debris and thereby avoid clogging in many instances.

Another advantage of the present invention is that the fluid flow metering device includes means for self-cleaning in the event a piece of debris is ingested. Some prior art metering devices permit the accumulation of foreign debris which eventually limits or prevents flow. The present invention, on the other hand, includes flow restriction plates spaced apart from one another, the orifice of each is positioned adjacent the interior wall of the duct and misaligned with adjacent orifices. Together, these features create an internal side-to-side fluid flow pattern. The side-to-side flow pattern induces flow vortices in the corners formed between the flow restriction plates and the internal wall surface of the duct. The side-to-side flow pattern and induced vortices scrub the chambers formed between flow restriction plates and inhibit the accumulation of foreign debris within the duct. Hence, the present invention may be described as "self-cleaning".

These and other objects, features and advantages of the present invention will become apparent in light of the detailed description of the best mode embodiment thereof, as illustrated in the accompanying drawings.

BEST MODE FOR CARRYING OUT THE INVENTION

Figure 1:
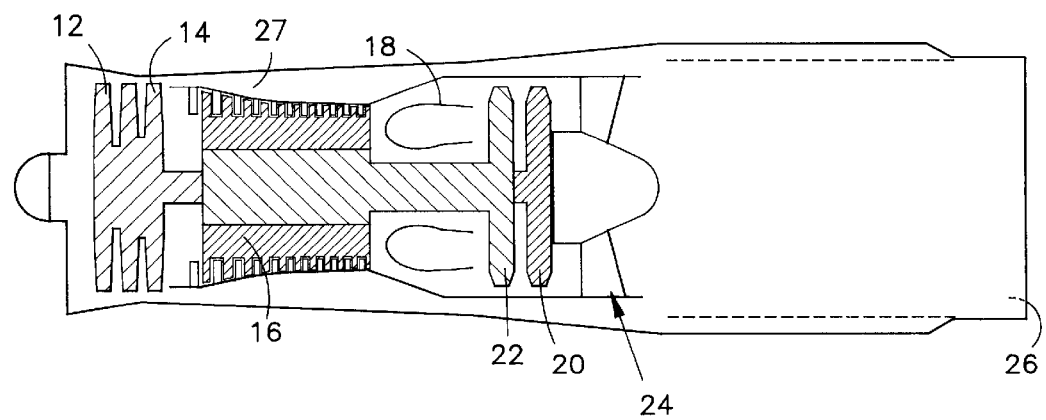
FIG. 1 is a diagrammatic view of a gas turbine engine.

Referring to FIG. 1, a gas turbine engine 10 includes a fan section 12, a low pressure compressor 14, a high pressure compressor 16, a combustor 18, a low pressure turbine 20, and a high pressure turbine 22, an augmentor 24, and a nozzle 26. The fan section 12 and the low pressure compressor 14 are connected to one another and are driven by the low pressure turbine 20. The high pressure compressor 16 is driven by the high pressure turbine 22. Air worked by the fan section 12 will either enter the low pressure compressor 14 as "core gas flow" or will enter a passage 27 outside the engine core as "bypass air".

Figure 2:
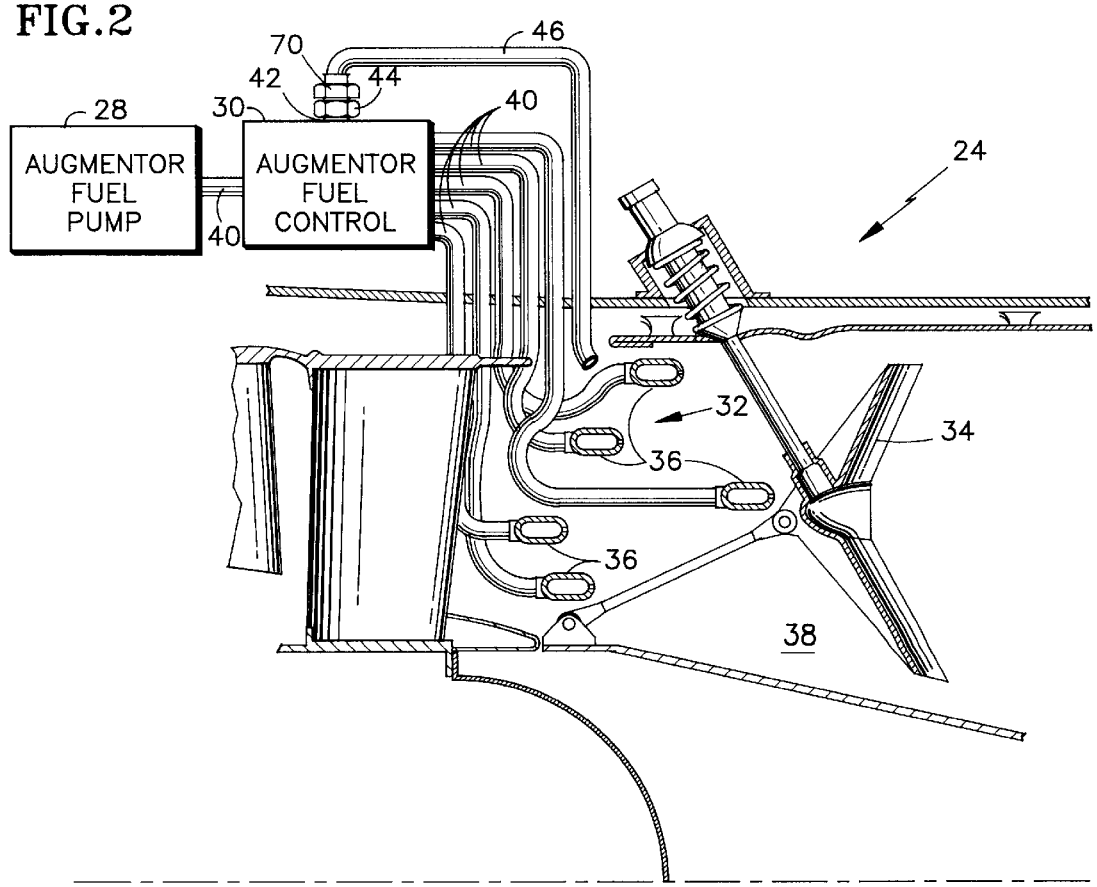
FIG. 2 is a diagrammatic partial view of a gas turbine engine augmentor.

Referring to FIG. 2, the augmentor 24 includes an augmentor fuel pump 28, an augmentor fuel control 30, means 32 for distributing the fuel, and a flame holder 34. The augmentor fuel pump 28 and control 30 are attached to an external surface of the engine 10 adjacent the augmentor 24. The means 32 for distributing the fuel includes a plurality of spray rings 36 disposed within the core gas flow path 38. A person of skill in the art will recognize that spray bars, nozzles, or the like (not shown) may be used as an alternative to spray rings 36. The flame holder 34 is an aerodynamic bluff body disposed in the core gas flow path 38 downstream of the spray rings 36. An ignition means (not shown) is normally positioned adjacent the downstream side of the flame holder 34. Plumbing 40 connects the augmentor fuel pump 28 to the fuel control 30 and the fuel control 30 to the spray rings 36. The augmentor fuel control 30 includes a drain port 42 for receiving a fuel drain metering device 44. A drain line 46, connected to the fuel drain metering device 44 by a fitting 70, extends between the metering device 44 and the core gas flow path 38 adjacent the spray rings 36.

Figure 3:
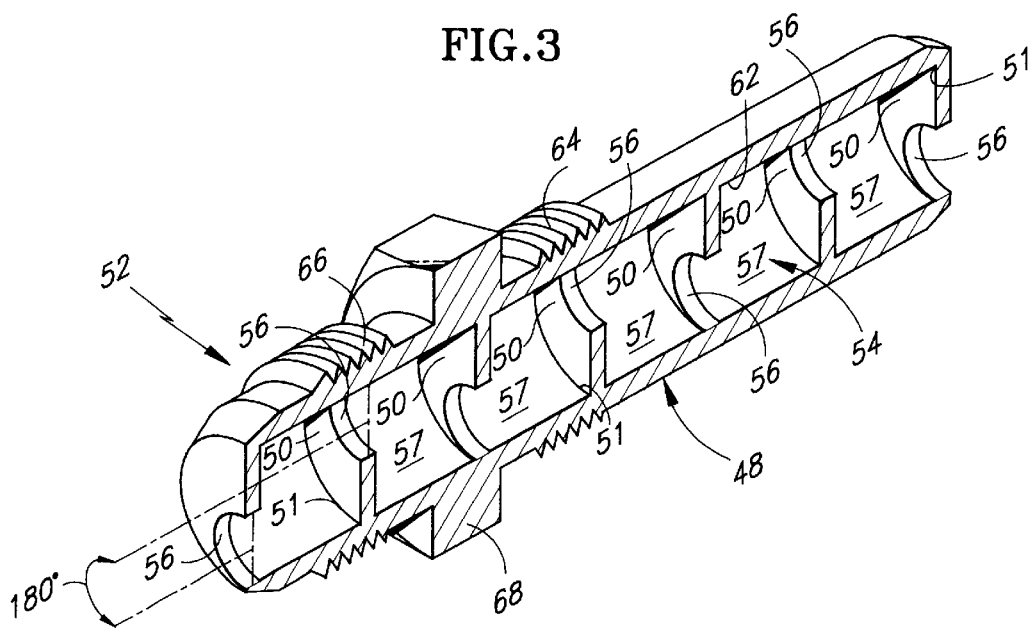
FIG. 3 is a sectional view of an embodiment of the present invention flow metering device.
Figure 4:
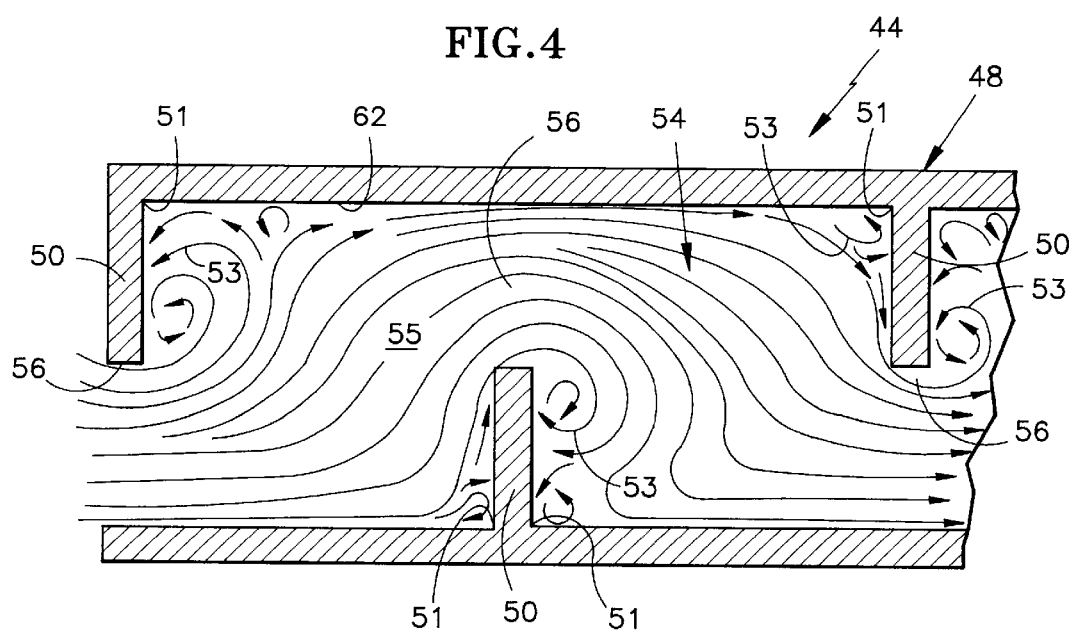
FIG. 4 illustrates the side-to-side fluid flow path within the present invention flow metering device.

Referring to FIGS. 3 and 4, the fuel drain metering device 44 includes a body 48, a plurality of flow restriction plates 50, and means 52 for attachment. The body 48 has a duct 54 extending lengthwise through the body 48. In the preferred embodiment, the body 48 and the duct 54 are cylindrically shaped. The flow restriction plates 50 are disposed in the duct 54, equally spaced from one another, forming chambers 57 between plates 50. Corners 51 are formed between the flow restriction plates 50 and the interior wall surface 62 of the duct 54. The means 52 for attachment includes a first male thread section 64, a second male thread section 66, and a hex head 68. The first male thread section 64 threads into the augmentor fuel control 30 and a fitting 70 (see FIG. 2) attaches the drain line 46 to the second male thread section 66.

Each flow restriction plate 50 has an orifice 56 sized to permit passage of the largest piece of foreign debris anticipated. The orifice is positioned in each plate 50 adjacent the interior wall surface 62 of the duct 54. Each orifice 56 is also misaligned with the orifice 56 of each adjacent plate 50. In the preferred version of the embodiment, the orifices 56 are circular, each having the same diameter, and misaligned 180° from adjacent orifices 56.

Referring to FIG. 2, in the operation of the device, fuel supplied to the augmentor 24 during augmented flight produces thrust in addition to that produced normally by the engine 10. The augmentor fuel pump 28 provides the fuel, upon demand, at a high pressure ("$P_{aug}$") to the augmentor fuel control 30. The augmentor fuel control 30 distributes the fuel to the spray rings 36 at that same pressure ($P_{aug}$), less pressure drops due to leakage and/or plumbing losses. The fuel subsequently fills and pressurizes the spray rings 36 and is discharged into the core gas flow via valves (not shown) disposed within the spray rings 36. Ignitors (not shown) subsequently ignite the fuel and core gas flow mixture which, typically, remains lit until the fuel supply is canceled. The static pressure in the augmentor 24 adjacent the spray rings 36 may be referred to by the symbol "$P_{stat}$". The fuel pressure in the spray rings 36 under augmentation is much greater than the static pressure within the augmentor 24 adjacent the spray rings 36 ($P_{aug} \gg P_{stat}$).

When augmentor demand is canceled, the augmentor fuel pump 28 stops providing fuel to the augmentor fuel controller 30 and the valves (not shown) disposed within the spray rings 36 close. At this point, the augmentor fuel controller 30, the plumbing 40 between the controller 30 and the spray rings 36, and the spray rings 36 are filled with fuel at, or near, the pressure established by the augmentor fuel pump 28 ($P_{aug}$). At the same time, or shortly thereafter, a drain valve (not shown) disposed within the augmentor fuel controller 30 opens and allows the pressurized fuel to exit the controller 30, plumbing 40, and spray rings 36 via the fuel drain metering device 44 and drain line 46.

The fuel drain metering device 44 impedes the flow of fuel exiting the spray rings 36, controller 30 and plumbing 40, and thereby limits the volumetric flow rate of fuel draining into the core gas flow. The flow rate through the metering device 44 depends upon the physical characteristics of the metering device 44, the physical properties of the fuel passing through the device 44, and the environment in which the device 44 and fluid operate. In most cases, the physical properties of the fuel and the environment are considered when determining the physical characteristics of the metering device 44.

Referring to FIGS. 3 and 4, in the present invention, the spacing of the flow restriction plates 50 within the duct 54, the position of the orifices 56 within the plates 50, and the misalignment between adjacent orifices 56 create a side-to-side flow path 55 through the metering device 44. The side-to-side flow path 55 creates vortices 53 in the fluid in the corners 51, as can seen in FIG. 4, which help prevent foreign debris from becoming lodged and/or accumulating within the metering device 44. The relatively close spacing between plates 50 forces the flow to curl in a scrubbing manner as flow moves radially from orifice 56 to orifice 56, generating vortices 53 in all chamber corners 51. Too great a space between plates 50 will reduce the internal velocities in the side-to-side flow path 55 between adjacent orifices 56. This would discourage the formation of the vortices required to prevent the accumulation of foreign debris. Too small a space between plates 50 will create undesirable increases in fluid impedance, and to some extent, reduce the effectiveness of the side-to-side flow path to pass foreign debris. The exact spacing for the flow restriction plates 50 necessary to create the above described side-to-side flow path 55 and vortices 53 will vary depending upon the operating conditions of the application (i.e., the temperature, the difference in pressure across, the fluid used, the viscosity of the fluid, etc.), and can be determined empirically.

The pressure difference ($P_{aug}-P_{stat}=\Delta P$) driving the fuel through the fuel drain metering device 44 dissipates as the fuel drains. At the same time, fuel remaining within the spray rings 36 absorbs more thermal energy from the core gas flow passing the spray rings 36. If sufficient thermal energy is transferred, the fuel will begin to vaporize, thereby increasing the pressure within the spray rings 36 further driving the fuel through the metering device 44 and drain line 46. Eventually, the pressure equalizes within the spray rings 36 and the augmentor 24 where the drain line 46 dumps the fuel into the core gas flow.

Although this invention has been shown and described with respect to the detailed embodiments thereof, it will be understood by those skilled in the art that various changes in form and detail thereof may be made without departing from the spirit and the scope of the invention. For instance, FIGS. 3 and 4 show a flow metering device 44 having seven flow restriction plates 50. In alternative embodiments, the number of restriction plates 50 may vary.

We claim:

1. A self-cleaning augmentor fuel drain metering device, comprising:

a body, having a duct with an interior wall surface and a first centerline;

a plurality of flow restriction plates, disposed in said duct spaced apart a distance from one another, wherein each flow restriction plate includes an orifice with a second centerline, and each said orifice is positioned adjacent said interior wall surface of said duct, and wherein a corner is formed between each said flow restriction plates and said interior wall surface of said duct; and wherein said orifices are misaligned with orifices in adjacent plates, thereby creating a side-to-side flow path for fuel flow through said duct; and wherein said distance between adjacent restriction plates is such that vortices in said fuel flow are sustained in said corners as fuel follows said side to side flow path within said duct via said orifices, wherein said vortices inhibit accumulation of foreign debris within said duct.

2. A self-cleaning augmentor fuel drain metering device according to claim 1, wherein said first and second centerlines are substantially parallel.

3. A self-cleaning augmentor fuel drain metering device according to claim 1, wherein said orifices are misaligned 180° from adjacent orifices.

4. A self-cleaning augmentor fuel drain metering device according to claim 1, wherein said orifices are sized to permit passage of substantially all foreign debris.

5. A self-cleaning augmentor fuel drain metering device according to claim 4, wherein said orifices have equal diameters.

6. A self-cleaning augmentor fuel drain metering device according to claim 1, wherein said orifices are contiguous with said interior wall surface.

7. A fluid flow metering device, comprising:

a body, having a duct with an interior wall surface and a first centerline;

a plurality of flow restriction plates, disposed in said duct spaced apart a distance from one another, wherein each flow restriction plate includes an orifice with a second centerline, and each said orifice is positioned adjacent said interior wall surface of said duct, and wherein a corner is formed between each said flow restriction plates and said interior wall surface of said duct; and wherein said orifices are misaligned with orifices in adjacent plates, thereby creating a side-to-side flow path for fuel flow through said duct; and wherein said distance between adjacent restriction plates is such that vortices in said fuel flow are sustained in said corners as fuel follows said side to side flow path within said duct via said orifices, wherein said vortices inhibit accumulation of foreign debris within said duct.

8. A fluid flow metering device according to claim 7, wherein said first and second centerlines are substantially parallel.

9. A fluid flow metering device according to claim 7, wherein said orifices are misaligned 180° from adjacent orifices.

10. A self-cleaning augmentor fuel drain metering device according to claim 7, wherein said orifices are sized to permit passage of substantially all foreign debris.

11. A fluid flow metering device according to claim 10, wherein said orifices have equal diameters.

12. A fluid flow metering device according to claim 7, wherein said orifices are contiguous with said interior wall surface.

* * * * *